United States Patent
Soulie

(10) Patent No.: US 9,042,254 B2
(45) Date of Patent: May 26, 2015

(54) COMMUNICATION METHOD BETWEEN TWO DISTINCT NETWORKS WITH RADIO COMMUNICATION NODES, ASSOCIATED PROCESSING MODULE AND COMPUTER PROGRAM

(71) Applicant: Thales, Neuilly sur Seine (FR)

(72) Inventor: Antoine Soulie, Gennevilliers Cedex (FR)

(73) Assignee: THALES, Neuilly sur Seine (FR)

( * ) Notice: Subject to any disclaimer, the term of this patent is extended or adjusted under 35 U.S.C. 154(b) by 168 days.

(21) Appl. No.: 13/731,781

(22) Filed: Dec. 31, 2012

(65) Prior Publication Data

US 2013/0182590 A1 Jul. 18, 2013

(30) Foreign Application Priority Data

Dec. 29, 2011 (FR) ...................... 11 04143

(51) Int. Cl.
 *H04J 1/16* (2006.01)
 *H04W 84/18* (2009.01)
 *H04W 64/00* (2009.01)
 *H04W 40/20* (2009.01)
 *H04W 92/02* (2009.01)

(52) U.S. Cl.
 CPC .............. *H04W 84/18* (2013.01); *H04W 40/20* (2013.01); *H04W 92/02* (2013.01); *H04W 64/003* (2013.01)

(58) Field of Classification Search
 CPC ...................................................... H04W 84/18
 USPC .................................................. 370/252, 255
 See application file for complete search history.

(56) References Cited

U.S. PATENT DOCUMENTS

| 7,567,826 | B2 * | 7/2009 | Sugaya ......................... 455/574 |
| 8,078,722 | B2 * | 12/2011 | Harvey et al. ................. 709/224 |
| 2009/0122738 | A1 | 5/2009 | Chen et al. |

FOREIGN PATENT DOCUMENTS

EP 1 134 939 A1 9/2001

* cited by examiner

*Primary Examiner* — Wei Zhao
(74) *Attorney, Agent, or Firm* — Davidson, Davidson & Kappel LLC

(57) ABSTRACT

A communication method between two distinct networks with radio communication nodes, includes the following steps: collecting geographical location information for the nodes of the first and second network, deducing a geographical coverage area of the first and second network as a function of geographical location information; determining an intersection zone of the geographical coverage areas; identifying, as a function of the collected location information, nodes of the first and second network, located inside said intersection zone; and sending said nodes of the first identified network data indicating the collected geographical locations of the nodes of the second identified network.

16 Claims, 2 Drawing Sheets

COMMUNICATION METHOD BETWEEN TWO DISTINCT NETWORKS WITH RADIO COMMUNICATION NODES, ASSOCIATED PROCESSING MODULE AND COMPUTER PROGRAM

This claims the benefit of French Patent Application No. 11 04143, filed Dec. 29, 2011 and hereby incorporated by reference herein.

The present invention relates to a communication method between first and second distinct networks with radio communication nodes connected by a gateway system, the nodes being equipped with radio communication means and geographic location means.

The first and second networks are for example ad hoc networks.

BACKGROUND

In a known manner, an ad hoc network is provided with no fixed infrastructure and stations, equipped with radio transmission and/or reception means and appropriate protocols make up the nodes of the network and communicate with each other by means of a radio channel, or several radio channels, which are shared.

Ad hoc networks are in particular used to implement tactical communications between military teams, moving over combat zones. For example, each team is equipped with a radio transceiver station that constitutes one node of an ad hoc network. Several teams are generally grouped together into groups, the teams within a same group for example falling under a same hierarchical commander. Groups may also be made up of military forces from different countries.

Certain groups may use communication protocols specific to them. In this way, heterogeneous ad hoc communication networks may be deployed over a same zone, and may not communicate with each other.

Each group generally constitutes an ad hoc network, or ad hoc sub-network, for ad hoc transmission dedicated to that group.

Distinct radio communication resources are allocated to each of these networks or sub-networks, for example at least one radio channel or predetermined time slot of such a channel.

Below, the term "network" will refer to one such network or sub-network.

Such situations of allied teams using heterogeneous transmission networks are also encountered in the technical migration phases of the radio communication means.

In such an environment, friendly fire may be avoided by the knowledge, at the nodes of a network dedicated to a team, of the geographical location of the allied teams, by implementing a data broadcast service indicating the position of each node in its geographical vicinity. This service is called "Blue Force Tracking" (BFT). The position of a node is for example provided by a position detection module whereof the node is typically equipped with a GPS (Global Positioning System) module.

The BFT service must be made available over all of the networks and sub-networks in a same geographical area, i.e. such a position message must be received by the nodes in a geographical neighborhood of the transmitting node, whether they are part of the same network as that transmitting node or another network.

Traditionally, any message or packet that must be broadcast from one network to another is done via at least one inter-network node. In the case of a BFT message, such processing also applies, since the current state of the art does not use geographical information to filter the broadcast. Thus, the positions of the nodes of a network are transmitted from one network to all of the nodes of another network by means of at least one specific node, called gateway node. This generates a significant burden on the radio networks, in particular their ad hoc networks, since each position update for a node gives rise to a message that must be communicated to all of the nodes of the other network, by means of the gateway node(s), in the absence of filtering.

SUMMARY OF THE INVENTION

As a result of these burden issues, it is not possible to provide a global BFT service in a zone where a large number (e.g. 50 to 100 nodes per network) of nodes of distinct networks are deployed, the radio coverage zones of each network being able to at least partially overlap or be adjacent.

There is therefore a need for a solution that makes it possible to establish a Blue Force Tracking service taking into account:

this heterogeneity of the radio communication means, giving rise to the impossibility for a node of systematically receiving the position of an adjacent node within the geographical meaning using different communication means, the impossibility of proceeding with the systematic broadcast (said to be "by flooding") of the positions between the different elementary networks, which causes overload problems on the most stressed networks in terms of bandwidth (i.e., broadcast of a BFT message every 10 seconds by each of 200 nodes in a network with less than 2 kb/s to be shared by all of the participants).

The present invention aims to propose such a solution.

To that end, according to a first aspect, the invention proposes a communication method between a first and second distinct ad hoc network with radio communication nodes as described above, characterized in that it comprises the following steps:

a/ collecting first, second, respectively, geographical location information for the first, second, respectively, network nodes, said information being determined and transmitted by said nodes;

b/ deducing a first, second, respectively, geographical coverage area of the first, second, respectively, network as a function of first, second, respectively, geographical location information;

c/ determining an intersection zone of the first and second geographical coverage areas;

d/ identifying, as a function of the first, second, respectively, collected location information, nodes of the first, second network, respectively, located inside said intersection zone;

e/ sending said identified nodes of the first network, from the gateway system and by means of said first node, data indicating the collected geographical locations of the identified nodes of the second network.

In further embodiments, the invention also has one or more of the following features:

the method also comprises the following step:

f/ sending said identified nodes of the second network, from the gateway system, by means of said second node, data indicating the collected geographical locations of the identified nodes of the first network;

the first network and/or the second network is an ad hoc radio communication network;

some of the steps a/ to d/, or all of the steps a/ to d/, are carried out by ad hoc radio communication nodes;

some of the steps a/ to d/, or all of the steps a/ to d/, are carried out by the gateway system;

the data indicating the collected geographical locations of the identified nodes is accompanied by identification data for said identified nodes and/or a time indication relative to the location;

at least steps a/ to d/ are regularly reiterated following the transmission by the nodes of updated location information;

if in step c/ it is determined that the first and second geographical coverage areas do not include intersection zones, a distance between the first and second geographical coverage areas is computed, and an update period for the geographical location of the nodes is determined as a function at least of said computed distance.

According to a second aspect, the invention proposes a processing module adapted to operate in a communication system including a first network of radio communication nodes connected by a gateway system to a second, distinct network of radio communication nodes, the gateway system comprising first telecommunications means with at least one first node of the first network and second telecommunications means with a second node of the second network, the nodes being equipped with radio communication means and geographical location means, the processing module being characterized in that it is adapted to collect first geographical location information for the nodes of the first network, said information being determined and transmitted by said nodes, and to deduce therefrom a first geographical coverage area of said first network;

the processing module is also adapted to determine an intersection zone between said first geographical coverage area and a second coverage area of the second network and to identify, as a function of the first collected location information, nodes of the first network located inside said intersection zone;

the processing module being adapted to receive data coming from the gateway system and indicating the geographical locations at least of nodes of the second network that are identified as located in the intersection zone and to transmit to said identified nodes, of the first network, by means of said first node, said data indicating the collected geographical locations of the identified nodes of the second network.

According to a third aspect, the invention proposes a transceiver station adapted to form a node of the ad hoc network and including a processing module according to the second aspect of the invention.

According to a fourth aspect, the invention proposes a computer program adapted to form a node of the network, said program comprising instructions for updating the following steps when the program is run by the processing means of said station:

collecting first geographical location information of the nodes of a first network to which the station belongs, said information being determined and transmitted by said nodes, and deducing a first geographical coverage area of the first network therefrom;

determining an intersection zone between said first geographical coverage area and a second coverage area of a second network distinct from the first network and identifying, as a function of the first collected location information, nodes of the first network located inside said intersection zone;

receiving data indicating geographical locations at least of nodes of the second network identified as located in the intersection zone and transmitting, to said identified nodes of the first network, said data indicating the collected geographical locations of the identified nodes of the second network.

BRIEF DESCRIPTION OF THE DRAWING

Other features and advantages of the invention will appear upon reading the following description. This description is purely illustrative and must be read in light of the appended drawings, in which.

DETAILED DESCRIPTION

Figure 1:
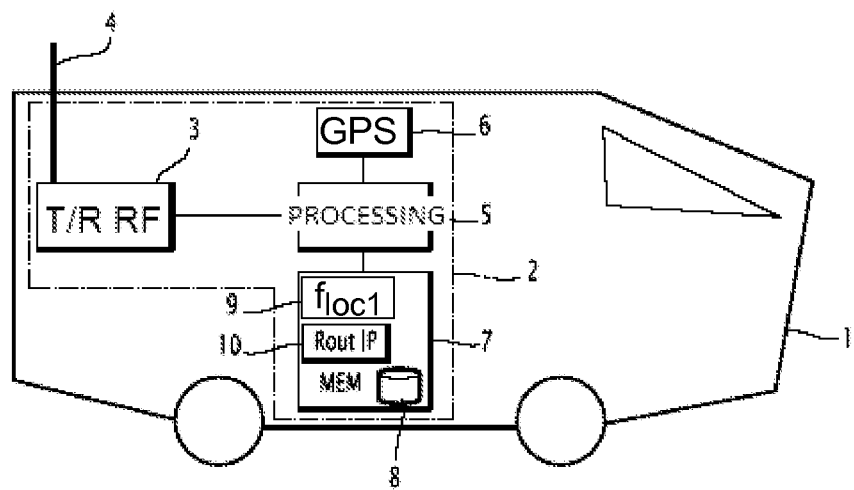
FIG. 1 is a view of a vehicle transporting an intervention team and constituting a node of an ad hoc network.

FIG. 1 shows an armored vehicle 1 equipped with a communication station 2 designed to constitute a node 2 of an ad hoc network.

A communication station 2 includes a processing module 5, a GPS module 6 and a memory 7.

The memory 7 includes a database 8.

The processing module 5 is adapted to steer the operation of the various components of the node 2 and in particular includes a microprocessor on which software stored in memory 7 runs.

A communication station 2 also includes, so as to exchange signal frames with an adjacent node by means of a shared radio channel, a radiofrequency transceiver radio module 3 connected to an antenna 4.

The shared radio channel allocated to the node may be predetermined, or selected by the station 2 from a list for example stored in the memory 7 as a function of various criteria, in particular resulting from signal exchanges with adjacent nodes.

The radio module 3 comprises a MAC (Medium Access Control) layer, a Baseband physical layer, and a radiofrequency physical layer. The radio module 3 is adapted, under the driving of the processing unit 5, to receive and process a radiofrequency signal coming from the antenna 4, or to allow the development and transmission of a radiofrequency signal from the antenna 4.

In one embodiment, the signals exchanged are in accordance with protocol IEEE 802.11 or non-standardized protocols in force in the military radio communications field, and for example include voice publication data, or messages of the SMS, MMS or instant message type.

In the considered embodiment, the radio module 3 is adapted to operate, under the driving from the processing module 5, in half-duplex communication mode.

In the considered embodiment, the radio module 3 is also adapted to operate, in reception and transmission, on only one radio channel at all times.

The communication station 2 is adapted to carry out regularly, under the driving from the processing module 5, a function $f_{loc1}$ 9 for broadcasting the location of the station. This function corresponds to software instructions stored in the memory 7 and run on the microprocessor of the processing module 5. It comprises the command for the GPS module 6 to locate the station, the determination of the location of the station 2 by the GPS module 6, and the transmission by the radio module 3 of the station 2 on a radio channel allocated for transmission by the station 2, the message including data indicating the determined location, these steps being reiterated for example at a frequency $F_{loc1}$.

In a communication cycle, the radio node 2 is adapted, during a transition phase, to transmit data indicating its preference and in particular including an identifier, and/or to transmit data to be relayed and/or data indicating its location, for example determined by the function $f_{loc1}$.

In a reception phase of the communication cycle, the radio node 2 is adapted to receive data on the radio channel allocated to it, indicating the presence of other nodes near the radio, and/or of data to be relayed and/or data indicating the location of other nodes.

In the considered embodiment, the node 2 updates its database 8 by recording therein on the one hand, in a list of radio neighbors, the identifiers of the nodes that are within its radio range, i.e., that indicated their presence on the radio channel, and on the other hand to record the location of nodes regarding which it has received location data therein.

Figure 2:
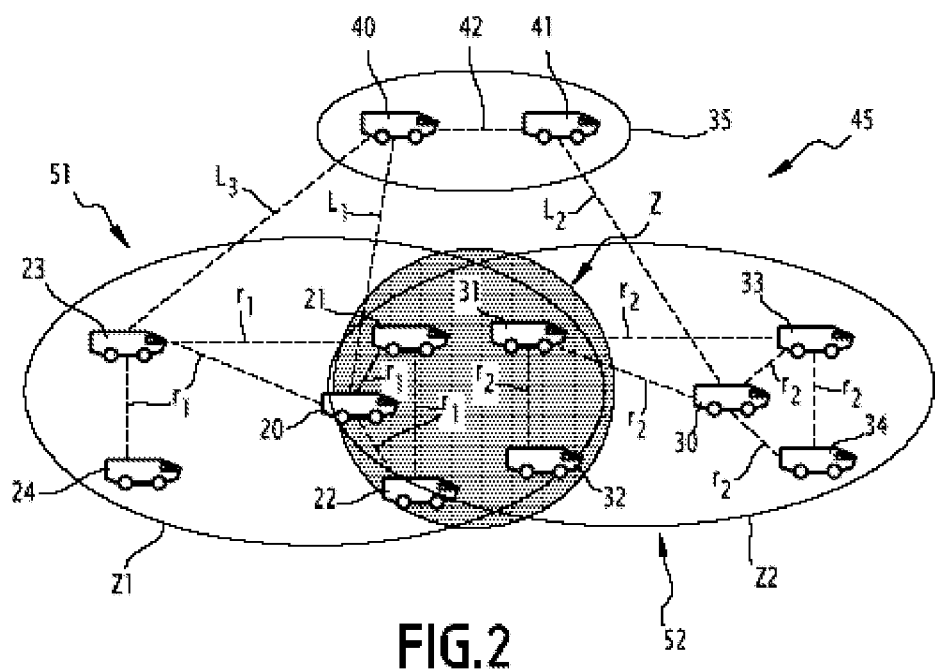
FIG. 2 shows a military operation zone on which teams are operating using distinct radio communication networks.
Figure 3:
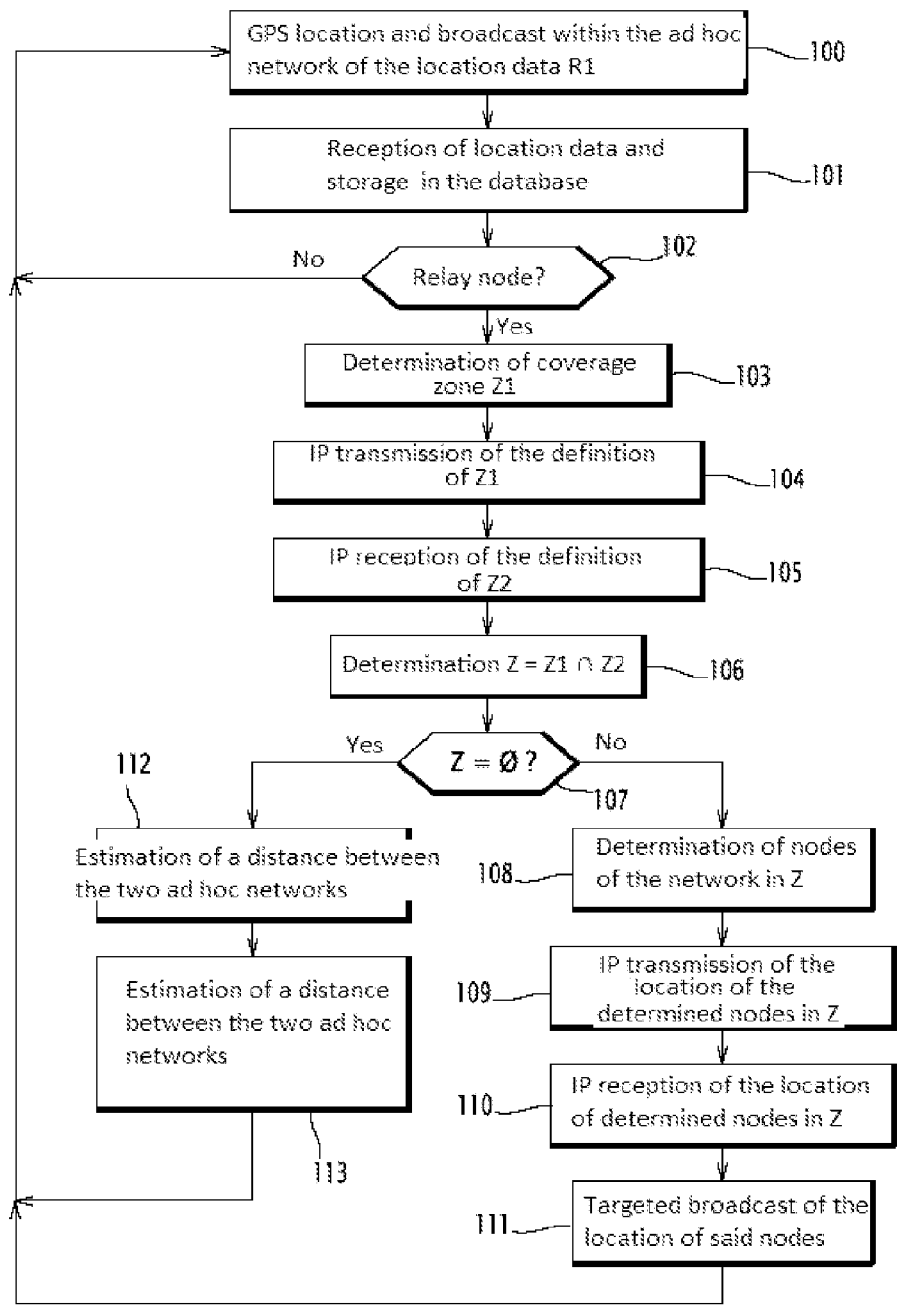
FIG. 3 is a flowchart showing the steps in a method for implementing the invention.

FIG. 2 shows a military operation zone 45 over which armored vehicles are operating. These vehicles 20, 21, 22, 23, 24, 30, 31, 32, 33, 34 are similar to the armored vehicle 1 shown in FIG. 1 and carry respective allied military teams.

These vehicles give rise to the establishment of two distinct ad hoc networks of nodes 51 and 52.

Below, the vehicle and the node it contains are identified using the same references. Furthermore, a module of a node identified in FIG. 1 with a reference 3 to 8 will be identified below using that same reference indexed by the reference of the considered node as used in FIG. 2: thus, the processing module of the node 20 will be identified below using reference $5_{20}$.

In this way, the nodes 20, 21, 22, 23, 24 make up the first ad hoc network 51 and communicate with each other closely by means of a same radio channel r1. Direct radio links are established between the nodes within radio range of each other, i.e., between the nodes 20 and 21, the nodes 21 and 22, the nodes 21 and 23, the nodes 20 and 23, the nodes 23 and 24, and the nodes 20 and 22.

In the first ad hoc network 51, any two nodes from among the nodes 20, 21, 22, 23, 24 may communicate with each other by transmitting data over the channel r1 either directly when they are within radio range of each other, or by relay between intermediate nodes of the first network 51.

The nodes 30, 31, 32, 33, 34 make up a second ad hoc network 52 and communicate with each other very closely by means of a same radio channel r2 distinct from the radio channel r2. Direct radio links are established between nodes within radio range of each other, i.e. between the nodes 30 and 31, the nodes 30 and 33, the nodes 30 and 34, the nodes 33 and 34, the nodes 31 and 32, and the nodes 31 and 32.

In the second ad hoc network 52, any two nodes from among the nodes 30, 31, 32, 33, 34 may communicate with each other by transmitting data over the channel r2 either directly when they are within radio range of each other, or by relay between intermediate nodes of the second network.

The communication protocol implement in each of these networks is for example of the OLSR ("Optimized Link State Routing Protocol") type.

The location messages transmitted by each of the nodes of the first network 51 are transmitted, on the channel r1, to the geographical neighbors of said node in the first network as well as to the nodes 20 and 23 as relay-nodes of the first network as defined below. Likewise, the location messages transmitted by each of the nodes of the second network 52 are transmitted, on the channel r2, to the geographical neighbors of said node in the second network as well as to the node 30 as relay-node of the second network as defined below.

These location messages relative to the first network 51 cannot be transmitted to the second network 52 directly by the ad hoc radio communication means, since the first ad hoc network 51 does not use the same radio resources as the second ad hoc network 52, and vice versa.

Furthermore, there cannot be any detection by a node from the first network 51 of the presence nearby of a node from the second network 52, since the node from the first network 51 listens in reception mode to the channel r1, while the node of the second network 52 indicates its presence on the radio channel r2 and vice versa.

However, it would be interesting, to avoid firing between two vehicles located near one another and belonging to different networks, to know their respective positions.

In the considered embodiment, the radiofrequency transmission and reception by the nodes of a given ad hoc network take place on a same channel. In other embodiments, the transmission channel is distinct from the reception channel.

In the embodiment described above, a node is located using a GPS module. Of course, the invention may be implemented with other location means, for example an inertial unit, etc.

The invention may be implemented between two or more heterogeneous ad hoc networks, irrespective of their disparities, and in particular the differences between the respective communication protocols: for example, the radio channels used and/or the waveforms and/or the communication protocols implemented, etc. The invention may also be implemented between an ad hoc network and a cellular network, or even between two cellular networks (e.g. operated by different mobile Internet operators).

In one embodiment of the invention, a gateway system 35 is implemented between the first ad hoc network 51 and the second ad hoc network 52, making it possible to indicate data between those two networks.

The gateway system 35 is connected to at least one node of the first network 51 and at least one node of the second network 52, which are called relay-nodes. It is adapted to exchange data with each of said nodes, and to relay at least some of said data between those nodes, possibly after having performed certain processing operations, for example for aggregating the location data provided by the relay-nodes, shaping to adapt to the specific waveform used by each of the networks (in one embodiment, at least some of these operations are carried out in the relay-nodes themselves, in particular queuing as a function of priority, defining the reliable station of the broadcast on the ad hoc network, repeating lost messages). The relaying done between the two ad hoc networks is for example done using a telecommunications network implementing cellular and/or wired and/or satellite radio means.

In the considered case, the gateway system 35 is connected to the node 20, the node 23, respectively, of the first ad hoc network 51 by a telecommunications link L1, L3, respectively, for example radio. The gateway system 35 is connected to the node 30 of the second ad hoc network 52 by a telecommunications link L2, for example radio. In the present case, the communication protocol used by the gateway system, including the links L1, L2 and L3, is an IP (Internet Protocol) protocol.

In the considered case, the IP link L1 has for ends the node 20 and a node 40, the IP link L3 has for ends the node 23 and the node 40, the IP length L2 has for ends the node 30 and a node 41, and an IP hop 42, for example radio, separates the nodes 40 and 41. The gateway system 35 may comprise one or more IP routers, and any number of hops, or no hops in addition to the links L1 to L3. The nodes 20, 23 and 30, as well as the set of nodes of the gateway system 35, here the nodes 40, 41, are identified by an identifier.

The nodes 20, 23 and 30 play the role of relay-nodes between the two ad hoc networks, by means of the gateway system 35. An IP routing table 10, identifying the IP addresses of all of these nodes, identifying the active relay-nodes and including routing rules adapted to allow the transmission of data from each of said nodes to a recipient, is stored in the memory 7 of at least the active relay-nodes.

In one embodiment of the invention, each node of the first 51 and second 52 ad hoc networks is adapted to implement the steps indicated below.

For example, all or some of these steps are carried out by a node 2 following the execution, on the microprocessor of the processing module 5, of software instructions stored in the memory 7.

In a step 100, as indicated above, each considered node 2 performs location operations, then broadcasts its location data, by carrying out its location broadcast function $f_{loc1}$ at a frequency $F_{loc1}$ whereof the value is defined in the memory 7.

In a step 101, the considered node regularly receives the position data for the nodes that are part of its ad hoc network, on the radio channel of its network (r1 for the first network, r2 for the second network) and as a function of that received data, it updates the location data associated with the identifiers of those nodes in its database 8.

In a step 102, the considered node determines whether it plays a role of active relay-node toward an ad hoc network other than its own as a function of the presence and/or the content of the routing table stored in its memory 7.

Only if the node is a relay-node, for example the node 20, it then carries out the following steps 103 to 113.

In a step 103, the node 20 determines the radio coverage zone Z1 of the first ad hoc network 51 to which it belongs, as a function of the geographical positions of the ad hoc nodes that are part of the first network 51 stored in its database $8_{20}$. Typically, this zone corresponds to the sum of the radio coverages corresponding to each node of the first ad hoc network 51, for example a circle with a radius of approximately 5 km around each node 20 to 24 (for example from a radius of 5 to 10 km for a 5 W VHF broadcast, a radius of 3 to 5 km for a 5 W UHF broadcast, a radius of 8 to 10 km for a GSM broadcast). According to one embodiment, this determination of the radio coverage accounts for the type of urbanization of the operation zone 45.

In a step 104, data for defining the coverage zone Z1 (for example, the contour or an approximate contour) of the first ad hoc network 51 to which the considered relay-node 20 belongs is transmitted by the latter, by means of the gateway system 35, to the relay-node 30 of the second ad hoc network, identified by its IP address as defined in the IP routing table $10_{20}$.

In a step 105, the considered relay-node 20 receives, from the active relay-node 30 of the second ad hoc network 30, by means of the IP gateway system 35, data for defining a radio coverage zone Z2 determined by the relay-node 30 and corresponding to the radio coverage of the second ad hoc network 52.

In a step 106, the considered relay-node 20 determines an intersection zone Z between the radio coverage zone Z1 of the first ad hoc network 51 and the radio coverage zone Z2 of the second ad hoc network 52 as received.

In a step 107, the relay-node 20 determines whether the intersection zone Z is null.

If, in step 107, it is determined that the intersection zone Z is non-zero, then in a step 108, the relay-node 20 determines the nodes of the first ad hoc network 51 located in the intersection zone, using location data for the nodes of the first network 51 stored in its database $8_{20}$: in the considered case, the nodes 21 and 22.

In a step 109, the relay node 20 sends the active relay-node 30, by means of the gateway system 35, information concerning said nodes 21 and 22 of the first network, for example, their location data optionally associated with identification data and/or data indicating the measurement time of the supplied location data.

In a step 110, the relay node 20 receives, from the active relay-node 30, by means of the gateway system 35, information regarding the nodes 31 and 32 of the second network, identified by the relay-node 30 as the nodes of the second network 52 situated in the intersection zone Z, for example, their location data optionally associated with identification data and/or data indicating the measurement time of the supplied location data.

In a step 111, the relay-node 20 sends at least the nodes of the first network 21 and 22 situated in the intersection zone Z the location data of the nodes 31 and 32 of the second network optionally associated with identification data and/or data indicating the measurement time of the supplied location data.

If in step 107, it is determined that the intersection zone Z is zero, then in a step 112, the node 20 estimates a distance between the coverage zone Z1 of the first network 51 and the coverage zone Z2 of the second network 52 (for example equal to MIN(Distance(XZ1; Y∈ Z2)) where X∈ Z1 represents any node of the first network situated in the zone Z1 and Y ∈ PZ2 represents any node of the second network belonging to the zone Z2, MIN is the "minimum" function and Distance(x;y) represents the distance between the nodes X and Y.

Then, in a step 113, it determines, as a function of the distance determined in step 112, an updated value of the frequency $F_{loc1}$ for measuring the position of the nodes in the first network 51 and/or an updated value of the broadcast frequency by the nodes of the first network of their updated location data and/or for updating the location data of the nodes of the first network 51 in the database of the nodes of the first network 51 (the frequency increasing as the determined distance decreases).

It will be noted that the order of the steps 104 and 105 may of course be inverted. The same is true for the order of the steps 109 and 110.

The steps described above are reiterated by the node 20 regularly, for example at a given frequency.

The steps described above in reference to the relay-node 20 are, in the considered embodiment, also implemented by the relay-node 30.

In another embodiment, the relay-node settles for transmitting the location data of the nodes of its network to the gateway system 35, all of the processing operations for determining the coverage zone Z1, Z2, Z (steps 103-104, 106-107) determining the nodes appearing in the zone Z (step 108), and forming information messages (step 109) being carried out by the gateway system 35.

Thus the invention, in one embodiment, makes it possible to transmit, from a first ad hoc network to a second ad hoc network different from the first, only the location information regarding the nodes of the first network near the nodes of the second network and vice versa.

Furthermore, in one embodiment, the invention makes it possible to broadcast, within the first network (the second network, respectively), location information for nodes of the second network (the first network, respectively) only to the nodes of the first network that are near those nodes of the second network whereof the location information is broadcast.

The invention thus makes it possible to provide a geographical BFT service, while guaranteeing a reduced volume for transmission of the corresponding data.

The present invention thus makes it possible to identify and make known to the allied teams located in an immediate geographical location, their mutual position, independently of the means and radio protocols used, while obtaining a significant reduction in the usage burden of the radio resources.

The invention may of course be implemented between three or more networks present over same geographical area.

Furthermore, above, a radio channel has been considered as corresponding to a radiofrequency, or a radiofrequency range. Of course, the invention may also be implemented for a radio channel equal to the use for a time fraction of a given radiofrequency, or of a range of given radiofrequencies.

In the invention described in reference to the figures, steps 100 to 113 are carried out in a processing module within the relay node. In another embodiment, all or some of the steps identified are carried out in a processing module outside the node, within the gateway system 35, for example in an IP node such as the node 41.

What is claimed is:

1. A communication method between a first and second distinct ad hoc network with first and second network nodes, respectively, said first and second ad hoc networks being connected by a gateway system, the gateway system comprising first telecommunications means with at least one first node of the first network nodes meds and second telecommunications means with a second node of the second network nodes, the first and second network nodes being equipped with radio communication means and geographic location means, the method comprising the following steps:
    a) collecting first and second geographical location information for the first and second network nodes, respectively, said first and second geographical location information being determined and transmitted by said first and second nodes, respectively;
    b) deducing a first and second geographical coverage area of the first and second networks, respectively, based on the first and second geographical location information, respectively;
    c) determining an intersection zone of the first and second geographical coverage areas;
    d) identifying, based on the first and second geographical location information, nodes of the first and second network nodes, respectively, located inside said intersection zone; and
    e) sending said identified nodes of the first network nodes, from the gateway system and via said first node, data indicating collected geographical locations of the identified nodes of the second network nodes.

2. The communication method as recited in claim 1 further comprising the following step:
    f) sending said identified nodes of the second network nodes, from the gateway system, via said second node, data indicating collected geographical locations of the identified nodes of the first network.

3. The communication method as recited in claim 1 wherein the first network and/or the second network is an ad hoc radio communication network.

4. The communication method as recited in claim 3 wherein some or all of the steps a) to d) are carried out by ad hoc radio communication nodes.

5. The communication method as recited in claim 1 wherein some or all of the steps a) to d) are carried out by the gateway system.

6. The communication method as recited in claim 1 wherein the data indicating the collected geographical locations of the identified nodes is accompanied by identification data for said identified nodes and/or a time indication relative to the collected geographical locations.

7. The communication method as recited in claim 1 wherein at least steps a) to d) are regularly reiterated following the transmission by the first and second nodes of updated location information.

8. The communication method as recited in claim 1 wherein if in step c) it is determined that the first and second geographical coverage areas do not include the intersection zone, a distance between the first and second geographical coverage areas is computed, and an update period for the collected geographical locations of the first and second nodes is determined as a function at least of said computed distance.

9. A processing module configured to operate in a communication system including a first network of radio communication first network nodes connected by a gateway system to a second, distinct network of radio communication second network nodes, the gateway system comprising first telecommunications means with at least one first node of the first network and second telecommunications means with a second node of the second network, the first and second network nodes being equipped with radio communication means and geographical location means, the processing module comprising:
    a processor configured to collect first geographical location information for the first network nodes, said information being determined and transmitted by said first network nodes, and to deduce therefrom a first geographical coverage area of said first network, and also configured to determine an intersection zone between said first geographical coverage area and a second coverage area of the second network and to identify, as a function of the first collected location information, nodes of the first network located inside said intersection zone; and also being configured to receive data coming from the gateway system and indicating geographical locations at least of nodes of the second network that are identified as located in the intersection zone and to transmit to said identified nodes of the first network, via said first node, said data indicating the collected geographical locations of the identified nodes of the second network.

10. The processing module as recited in claim 9 wherein the processor is also configured to form a message comprising data defining the intersection zone and to transmit said message via the gateway system.

11. The processing module as recited in claim 9 wherein the processor is also configured to form at least one message comprising data indicating geographical locations of the nodes of the first network located within said intersection zone and to transmit said message via the gateway system.

12. The processing module as recited in claim 11 wherein the processor is configured to include identification data for said identified nodes and/or a time indication relative to the collected geographical locations in the message.

13. The processing module as recited in claim 9 wherein the processor is configured to reiterate the collection of the geographical location information for the first network nodes, the deduction of a first geographical coverage zone of the first network, the determination of an intersection zone and the identification of nodes present in the intersection zone, regularly, following the transmission of updated location information by the first and second network nodes.

14. The processing module as recited in claim 9 wherein the processor is configured so as, when the first and second geographical coverage zones do not include the intersection zone, to compute a distance between the first and second geographical coverage zones, and determine an update period for the geographical location of the nodes as a function of at least said computed distance.

15. A transceiver station configured to form a node of an ad hoc network, the transceiver station comprising:
- a processing module configured to operate in a communication system including a first network of radio communication first network nodes connected by a gateway system to a second, distinct network of radio communication second network nodes, the gateway system comprising first telecommunications means with at least one first node of the first network and second telecommunications means with a second node of the second network, the first and second network nodes being equipped with radio communication means and geographical location means, the processing module comprising:
- a processor configured to collect first geographical location information for the first network nodes, said information being determined and transmitted by said first network nodes, and to deduce therefrom a first geographical coverage area of said first network, and also configured to determine an intersection zone between said first geographical coverage area and a second coverage area of the second network and to identify, as a function of the first collected location information, nodes of the first network located inside said intersection zone; and also being configured to receive data coming from the gateway system and indicating geographical locations at least of nodes of the second network that are identified as located in the intersection zone and to transmit to said identified nodes of the first network, via said first node, said data indicating the collected geographical locations of the identified nodes of the second network.

16. A non-transitory computer-readable medium encoded with a computer program intended for a radiofrequency transceiver station, configured to form a node of the network, said program comprising instructions for executing the following steps when the program is run by a processor of said station:
- collecting first geographical location information of nodes of a first network to which the station belongs, said information being determined and transmitted by said nodes, and deducing a first geographical coverage area of the first network therefrom;
- determining an intersection zone between said first geographical coverage area and a second coverage area of a second network distinct from the first network and identifying, as a function of the first collected location information, the nodes of the first network located inside said intersection zone; and
- receiving data indicating geographical locations at least of nodes of the second network identified as located in the intersection zone and transmitting, to said identified nodes of the first network, said data indicating the collected geographical locations of the identified nodes of the second network.

* * * * *